Oct. 25, 1960  A. W. BEAURLINE  2,957,700
GOLF CARTS
Filed July 24, 1958  2 Sheets-Sheet 1
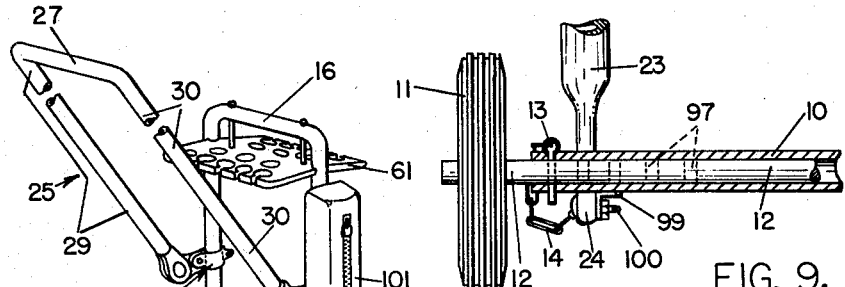
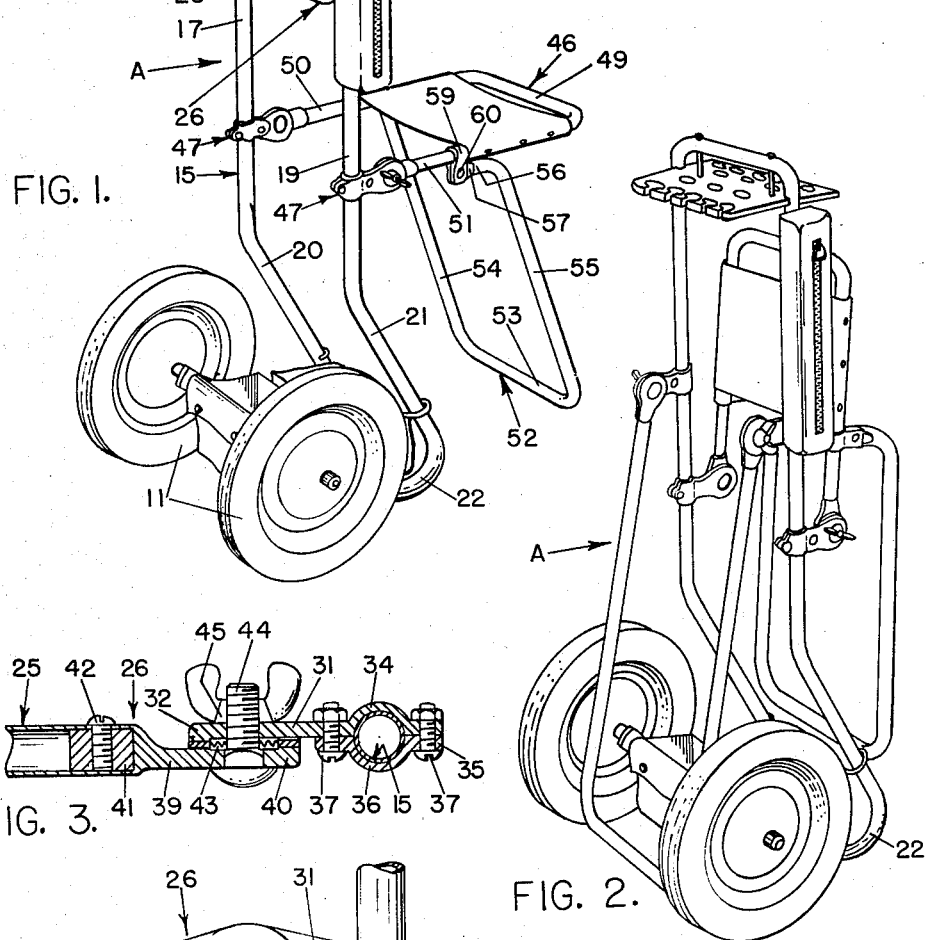
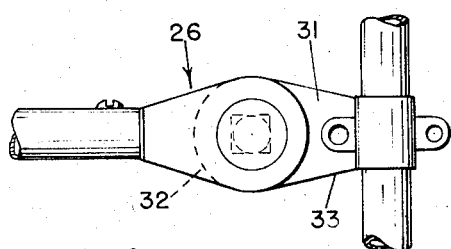
INVENTOR,
ARTHUR W. BEAURLINE.
BY Robert M. Dunning
ATTORNEY Oct. 25, 1960 A. W. BEAURLINE 2,957,700
GOLF CARTS
Filed July 24, 1958 2 Sheets-Sheet 2

INVENTOR,
ARTHUR W. BEAURLINE.
BY
ATTORNEY

United States Patent Office 2,957,700
Patented Oct. 25, 1960

2,957,700

GOLF CARTS

Arthur W. Beaurline, 323 Huntington Lane, Elmhurst, Ill.

Filed July 24, 1958, Ser. No. 750,696

1 Claim. (Cl. 280—47.19)

This invention relates to an improvement in golf carts and deals particularly with a wheeled device for carrying golf clubs and which may also serve as a seat for the golfer during periods of waiting.

During recent years, the use of wheeled carts for carrying golf bags has become increasingly popular. These carts usually comprise foldable frames to which a golf bag may be secured so that the bag may be rolled from place to place rather than carried about. It is an object of the present invention to provide a cart which may serve as a support for the golf clubs which may function in the manner of other types of carts but which eliminates the need of a golf bag.

A feature of the present invention resides in the provision of a cart including an axle connecting a pair of wheels and including a frame formed of tubular metal or the like which include portions inclining downwardly from the axle and engageable with the surface of the ground, these portions being reversely bent to extend upwardly to provide an upright standard portion when the cart is not being used. A pair of spaced receptacles are provided near the lower end of the frame into which the heads of the iron clubs may be inserted, with the shafts of the clubs extending upwardly. A resilient notched plate is provided near the upper end of the frame which is engageable with the shafts of the clubs to hold the clubs in a generally upright position. The notched plate is so arranged that the irons may be individually removed by merely lifting the club upwardly and disengaging the shaft from the notch. In view of this arrangement, the irons may be kept in proper order so that they may be readily selected by the player as they are used and may be replaced in proper position after use.

A further feature of the present invention resides in a provision of the standard described having a generally U-shaped handle pivotally connected thereto near the upper end of the standard by means of which the cart may be pulled over the surface of the ground.

A further feature of the present invention resides in the provision of a golf cart having an upright standard for supporting golf clubs in a substantially vertical position when the cart is stationary and in the provision of a seat pivotally connected to the standard. The seat may be swung into substantially vertical position against the standard when not in use and may be folded down into substantially horizontal position when desired for the support of the player.

A further feature of the present invention resides in the provision of a golf cart of the type described having a seat foldably connected to the standard, the seat including a generally U-shaped frame with the ends of the seat frame pivotally connected to the standard portion of the cart. A second generally U-shaped frame is hingedly connected to the undersurface of the seat and is folded in unison therewith. This second U-shaped frame extends downwardly from the seat into contact with the ground and includes offset end portions which extend beneath the U-shaped frame forming the seat to more effectively support the seat.

A further feature of the present invention resides in the provision of a club holder which includes a resilient plate having notches on opposite side edges which are releasably engageable with the shafts of the iron clubs. Openings are also provided through the body of the resilient plate inwardly of the edges thereof for the accommodation of the wooden clubs, such clubs being supported with their heads uppermost so that they may be readily selected.

These and other objects and novel features of the present invention will be more clearly and fully set forth in the following specification and claim.

In the drawings forming a part of the specification:

Figure 1 is a perspective view of the golf cart in unfolded position in readiness for use.

Figure 2 is a perspective view of the golf cart shown in Figure 1 in folded position.

Figure 3 is a sectional view through one of the brackets connecting an auxiliary frame to the main frame.

Figure 4 is a side elevational view of the bracket illustrated in Figure 3.

Figure 9 is an enlarged detail of the wheel mounting.

Figure 5:
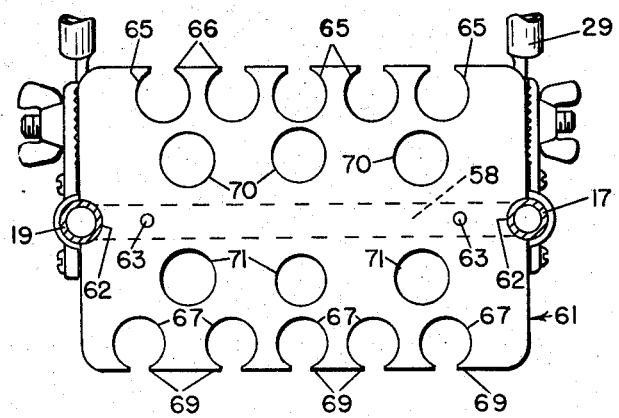
Figure 5 is a sectional view through the upper portion of the frame illustrating the resilient plate for use in holding the clubs.

The golf cart is indicated in general by the letter A and is foldable from the unfolded position illustrated in Figure 1 to the folded position shown in Figure 2. Obviously, one portion of the device may be unfolded independently of the other.

The cart includes a transverse axle which is in the form of a tubular member 10 which is supported by a pair of parallel wheels 11. As indicated in Figure 9 of the drawings, the wheels 11 are provided with stub shafts 12 about which the wheels may rotate. These stub shafts 12 are designed to extend into the ends of the tubular member 10 and to be releasably secured in place by removable pins 13. The pins 13 are connected to the frame by short lengths of chain 14 to prevent the loss of the pins 13 when they are withdrawn.

Figure 8:
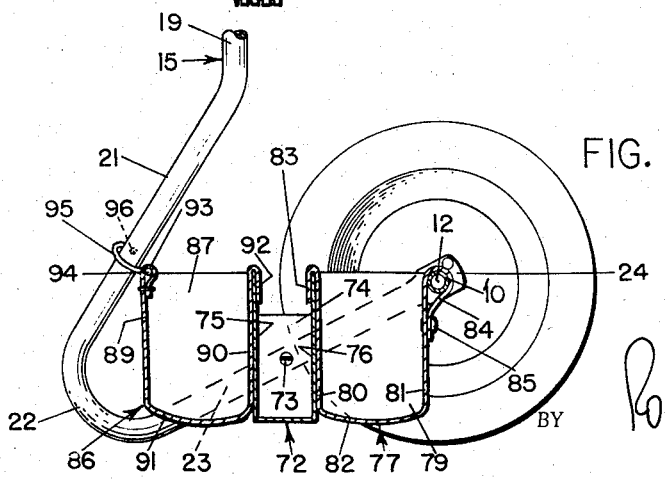
Figure 8 is a vertical sectional view through the lower portion of the cart.

The main frame of the cart A is indicated in general by the numeral 15 and preferably comprises a single length of metal tubing or the like bent to form the desired shape. The frame 15 includes a horizontal central portion 16 which is connected at its ends to a pair of parallel upright portions 17 and 19, which are supported in a substantially vertical position when the cart is not in use. The lower ends of the upright portions 17 and 19 are bent to provide rearwardly and downwardly inclined portions 20 and 21. The inclined portions 20 and 21 are bent reversely as indicated at 22 and terminate in upwardly and forwardly inclined portions 23, one of which is illustrated in Figure 8 of the drawings. The extremities of the upwardly inclined portions 23 are flattened as indicated at 24 and are drilled to accommodate the tubular axle 10.

As will be noted from Figure 8 of the drawings, the upright portions of the frame 15 are positioned intermediate of the rounded portions 22 and the wheel axle 10 when the cart is not in use. Accordingly, the cart will stand in an upright position when it is not being used.

A U-shaped handle 25 is adjustably connected to the vertical frame members 17 and 19 by clamps which are indicated in general by the numeral 26. The U-shaped handle member 25 includes a cross bar 27 which connects the upper ends of parallel members 29 and 30. The handle member 25 is preferably made of a light tubular metal or the like and may be folded from an upwardly and forwardly inclined position illustrated in Figure 1 of the drawings to a collapsed position extending downwardly from the clamps 26 in folded position as indicated in Figure 2.

The clamps 26 are formed as best illustrated in Figures 3 and 4 of the drawings. Each clamp 26 includes a clamping bracket 31 having a rounded end 32 and a radially extending portion 33 which is curved as indicated at 34 to partially encircle the tubular frame 15. A cooperable clamping plate 35 also includes an arcuate notch 36 which engages the opposite side of the frame member 15. Clamping bolts 37 extend through the clamping bracket 31 and clamping plate 35 to clamp the frame member 15 therebetween.

Each of the brackets 26 also includes a flat plate 39 provided with a rounded end 40 and extends in a radial direction to form a cylindrical plug 41 designed to extend into the end of one of the tubular members 29 or 30 of the handle member 25. A bolt 42 extends through the lower end of the handle frame 25 and through the plug 41 to hold the parts connected.

The surfaces of the rounded ends 32 and 40 of the bracket members 31 and 39 are provided with generally radially extending teeth 43 which may interengage. A clamping bolt 44 extends through the center of the rounded ends 32 and 40 and a wing nut 45 is provided on the clamping bolt 44 to clamp the rounded ends 31 and 40 in any adjusted relation.

A seat frame 46 is hingedly connected to the upright sides 17 and 19 of the supporting frame 15 by adjustable brackets 47 which are identical in form to the brackets 26. The seat frame 46 comprises a U-shaped tubular member including an intermediate connecting portion 49 and a pair of parallel frame sides 50 and 51. The ends of these frame sides 50 and 51 extend into engagement with the brackets 47 by means of plugs such as 41 forming a part of the brackets 47. Obviously, the seat frame 46 may be held in any desired pivotal relation by the clamping members.

A seat supporting frame 52 is pivotally attached to the sides 50 and 51 of the seat frame 46. The seat supporting frame 52 includes an intermediate cross member 53 which is connected at opposite ends to parallel frame sides 54 and 55. The upper ends of the frame sides 54 and 55 are angularly bent to provide end portions 56 which underlie the tubular frame sides 50 and 51 of the seat's frame 50 when the seat is in operative position. The ends of the end portions 56 are flattened as indicated at 57 to extend between the sides of a generally U-shaped clamp 59 which encircles the seat frame sides 50 and 51. Pivot bolts 60 extend through the clamps 59 to pivotally connect the seat supporting frame 52 to seat frame 46.

Figure 6:
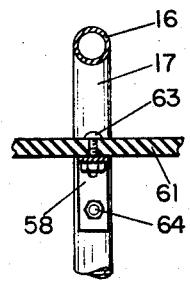
Figure 6 is a sectional view through the upper portion of the main frame and the resilient plate showing the manner in which the resilient plate is supported.
Figure 7:
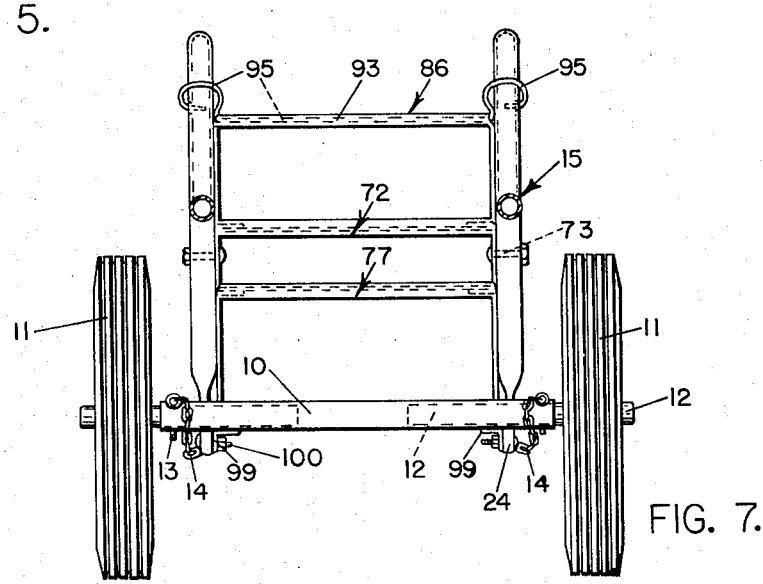
Figure 7 is a sectional view on a horizontal plane through the lower portion of the frame showing the spaced receptacles for supporting the clubs.

A resilient plate 61 of resilient material acts to support the various clubs. The plate 61 is provided with notches 62 in its opposite sides designed to accommodate the sides 17 and 19 of the main frame 15. As indicated in Figure 6 of the drawings, a cross brace 58 extends between the frame upright portions 17 and 19 and is secured thereto by suitable means such as bolts 64. Bolts 63 extend through the resilient plate 61 and through the cross brace 58 to support the plate.

As indicated in Figure 5 of the drawings, the plate 61 is provided with a series of apertures 65 near one edge of the plate and connected thereto by open notches 66 which are of proper size to accommodate the smaller portions of the shafts of the iron clubs but are not of large enough size to accommodate the handle ends thereof. The opposite edge of the plate 61 is provided with a similar series of apertures 67 connected to the edge by open notches 69. The proportions of the apertures 67 and notches 69 are similar to those previously described.

The iron clubs are designed to be supported as will be later described with the handle ends of the clubs upwardly. The plate 61 is of proper elevation so as to encircle the handle ends of the clubs. By grasping the handle end of any club and lifting it somewhat, the club can be readily withdrawn through the corresponding notch 66 or 69. The resilience of the plate 61 permits the sides of the notches to flex somewhat in the insertion and withdrawal of the clubs.

A row of apertures 70 are provided adjoining the apertures 65 and a similar row of apertures 71 are provided adjoining the apertures 67. These apertures 70 and 71 are designed to accommodate the ends of the wooden clubs with the heads of the clubs uppermost. The support for the lower ends of the clubs will now be described.

As indicated in Figure 8 of the drawings, a pan shaped support 72 is bolted or otherwise secured as at 73 to the inclined frame portions 23 of the frame 15. The bolts 73 extend through parallel end walls 74, one of which is shown in Figure 8. The sides 75 and 76 of the receptacle 72 extend upwardly above the upper edge of the ends. A flexible generally rectangular receptacle 77 of treated fabric or plastic material is suspended between the receptacle sides 76 and the axle 10. The receptacle 77 includes ends such as 79, sides 80 and 81, and a connecting bottom 82. The upper edge of the side 80 is folded downwardly upon itself and is secured at its ends to form a pocket flap 83 which accommodates the upper edge of the receptacle side 76. The opposite side 81 of the receptacle 77 is folded over the axle 10 with a projecting flap 84 and this flap is detachably connected to the wall 81 by means of snaps 85. By disengaging the snaps 85, the receptacle 77 may be lifted out of place for cleaning or replacement.

A somewhat similar receptacle 86 is suspended between the forward edge 75 of the receptacle 72 and the inclined portions 21 of the frame 15. The receptacle 86 includes ends 87, sides 89 and 90 and a connecting bottom 91. A flap 92 extends from the upper edge of the receptacle side 90 and is folded downwardly to overlie the upper portion of the side 90 and is secured to the side 90 at its opposite end edges. Thus a pocket is formed which is designed to accommodate the upwardly projecting edge of the side 75. A hem 93 is provided along the upper edge of the receptacle side 89. A cross brace 94 extends through the hem 93 and has its ends 95 looped partially about the inclined portions 21 of the frame 15, the ends of the looped portions 95 extending into opposed apertures 96 in the frame members 21. The loops 95 are sufficiently resilient to permit the cross member to be detached from the frame and lifted from the edge 95 of the supporting receptacle 72 for the purpose of cleaning or replacement.

As is indicated in Figure 9 of the drawings, the stub shafts 12 are of substantial length and are provided with a series of spaced apertures 97 extending therethrough. When the cart is being used in hilly territory, the pins 13 may be removed, the stub shafts 12 pulled partly outwardly, and the pins 13 removed to increase the width of the carrier at its base. As will also be noted from Figure 9 of the drawings, the axle 10 is held from rotation relative to the flattened ends 24 of the frame ends 23 by angle brackets 99 which may be spot welded or otherwise secured to the axle and detachably secured to the flattened ends 24 by a bolt 100 or other suitable means. This arrangement holds the axle 10 from moving axially relative to the frame 15 during operation of the cart.

It will be noted that the bottoms 82 and 91 of the receptacles 77 and 86 are but slightly above the surface of the ground when the cart is not in use and is standing upright. As the receptacles are formed of flexible material, the bottoms of the receptacles may flex down into contact with the ground if downward pressure is applied. Accordingly, if a club is dropped into the receptacle, the strain upon the receptacle is overcome by having the bottom flex downwardly against the ground. When the cart is in use the receptacles are raised upwardly so as not to engage the ground.

A ball holding case 101 is strapped or otherwise secured to the frame upright portion 19. This case provides a convenient location for spare golf balls.

In accordance with the patent statutes, I have described the principles of construction and operation of my improvement in golf carts, and while I have endeavored to set forth the best embodiment thereof, I desire to have it understood that changes may be made within the scope of the following claim without departing from the spirit of my invention.

I claim:

A foldable golf cart including a frame comprising an elongated tube bent to provide a substantially horizontal central portion, upright portions extending downwardly in parallel relation from opposite ends of said central portion, parallel inclined portions connected to the lower ends of said upright portions, and reversely bent portions connected to the lower ends of said inclined portions and inclining upwardly in parallel relation, an axle member connected to the extremities of said reversely bent portions, wheels rotatably secured to opposite ends of said axle, said wheels being parallel, a generally rectangular frame extending between said reversely bent portions and secured thereto in spaced relation to said axle, a flexible receptacle detachably secured to one side of said frame and detachably connected to said axle, a second receptacle detachably secured to the opposite side of said frame and detachably secured to said first named inclined portions of said frame, and means secured to said frame near the upper end thereof and engageable with the shafts of clubs resting in said receptacles.

References Cited in the file of this patent

UNITED STATES PATENTS

| | | |
|---|---|---|
| 2,262,298 | Procter | Nov. 11, 1941 |
| 2,367,234 | Mitchell | Jan. 16, 1945 |
| 2,539,336 | Sobers | Jan. 23, 1951 |
| 2,551,009 | Kaltenbach | May 1, 1951 |
| 2,556,814 | Love | June 12, 1951 |
| 2,590,154 | Burns | Mar. 25, 1952 |
| 2,599,928 | Lyons | June 10, 1952 |
| 2,662,776 | Hurst | Dec. 15, 1953 |
| 2,726,875 | Murcott | Dec. 13, 1955 |